United States Patent
Han et al.

(10) Patent No.: US 9,705,659 B2
(45) Date of Patent: Jul. 11, 2017

(54) METHOD AND APPARATUS FOR PROVIDING UPLINK FEEDBACK OPTIMIZATION

(75) Inventors: Jing Han, Beijing (CN); Erlin Zeng, Beijing (CN); Wei Bai, Beijing (CN); Haiming Wang, Beijing (CN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 497 days.

(21) Appl. No.: 14/008,298

(22) PCT Filed: Apr. 11, 2011

(86) PCT No.: PCT/CN2011/072600
§ 371 (c)(1),
(2), (4) Date: Sep. 27, 2013

(87) PCT Pub. No.: WO2012/139274
PCT Pub. Date: Oct. 18, 2012

(65) Prior Publication Data
US 2014/0016594 A1    Jan. 16, 2014

(51) Int. Cl.
*H04B 7/212*    (2006.01)
*H04L 5/00*    (2006.01)

(52) U.S. Cl.
CPC ............ *H04L 5/0094* (2013.01); *H04L 5/001* (2013.01); *H04L 5/0055* (2013.01)

(58) Field of Classification Search
CPC ..... H04L 5/001; H04L 5/0055; H04L 5/0094; H04W 72/0413
See application file for complete search history.

(56) References Cited

U.S. PATENT DOCUMENTS

| | | | |
|---|---|---|---|
| 2004/0224697 A1 | 11/2004 | Hakkinen et al. | |
| 2009/0103498 A1* | 4/2009 | Nilsson | H04L 1/0025 370/336 |
| 2010/0322154 A1 | 12/2010 | Chen et al. | |
| 2011/0310856 A1* | 12/2011 | Hariharan et al. | 370/336 |
| 2011/0317614 A1 | 12/2011 | Park et al. | |
| 2012/0039275 A1* | 2/2012 | Chen | H04L 1/1607 370/329 |

(Continued)

FOREIGN PATENT DOCUMENTS

| | | |
|---|---|---|
| CN | 1748435 A | 3/2006 |
| CN | 101873159 A | 10/2010 |
| WO | WO 2010/093183 A2 | 8/2010 |

OTHER PUBLICATIONS

International Search Report for Application No. PCT/CN2011/072600 dated Dec. 22, 2011.

*Primary Examiner* — Shaq Taha
*Assistant Examiner* — Ryan Kavleski
(74) *Attorney, Agent, or Firm* — Oblon, McClelland, Maier & Neustadt, L.L.P.

(57) ABSTRACT

A method for providing uplink feedback optimization may include determining a set of candidate uplink subframes and corresponding component carriers to transmit uplink feedback, and determining a selected uplink subframe and corresponding component carrier from among the set of candidate uplink subframes based on a feedback delay associated with the set of candidate uplink subframes. A corresponding apparatus and computer program product are also provided.

18 Claims, 6 Drawing Sheets

(56) References Cited

U.S. PATENT DOCUMENTS

| | | | |
|---|---|---|---|
| 2012/0076017 A1* | 3/2012 | Luo et al. ..................... | 370/252 |
| 2012/0093016 A1 | 4/2012 | Zhang et al. | |
| 2012/0170504 A1* | 7/2012 | Hoymann et al. ............ | 370/312 |
| 2012/0257554 A1* | 10/2012 | Kim ....................... | H04L 5/001 |
| | | | 370/280 |
| 2013/0308523 A1* | 11/2013 | Lee ..................... | H04J 11/0069 |
| | | | 370/315 |

* cited by examiner

METHOD AND APPARATUS FOR PROVIDING UPLINK FEEDBACK OPTIMIZATION

TECHNOLOGICAL FIELD

Embodiments of the present invention relate generally to connectivity enhancements for wireless devices and, more particularly, relate to a method, apparatus and computer program product for providing uplink feedback optimization.

BACKGROUND

Wireless communication technologies continue to facilitate ease of information transfer and convenience to users. In order to provide easier or faster information transfer and convenience, telecommunication industry service providers continue to develop improvements to existing networks. For example, the evolved universal mobile telecommunications system (UMTS) terrestrial radio access networks (UTRAN and E-UTRAN) and the GERAN (GSM/EDGE radio access network) system are currently being improved. Long Term Evolution-Advanced (LTE A), or 4G, is aimed at upgrading prior technologies by improving efficiency, lowering costs, improving services, making use of new spectrum opportunities, and providing better integration with other open standards. LTE A, like many other wireless communication networks, employs base stations that are connected to a network in order to wirelessly communicate with wireless communication devices that may be distributed throughout a coverage area of a given base station.

The base stations, which are typically referred to as eNBs (enhanced node Bs) in LTE A, typically serve as wireless communication access points for a wireless communication device that may be referred to as, for example, a subscriber station (SS), a mobile station (MS), a mobile terminal (MT) or user equipment (UE). A recent focus in relation to improving wireless services by enabling higher data rate service with lower latency and reduced cost has been carrier aggregation. For release 10 (Rel-10) in LTE time division duplex (TDD) systems, there was an agreement that only aligned TDD downlink (DL)/uplink (UL) configuration across cells would be allowed to be aggregated in order to improve simplicity. However, Rel-11 and beyond are likely to allow different TDD configurations in consideration of realistic deployment. For example, different TDD configurations may be configured in different discontinuous component carriers (CCs) in a so-called CC-specific TDD configuration. Thus, it may be desirable to consider improvements related to CC-specific TDD configurations.

BRIEF SUMMARY OF EXAMPLE EMBODIMENTS

A method, apparatus and computer program product are therefore provided to enable uplink feedback optimization. In this regard, in some example embodiments, a mechanism is provided for enabling uplink feedback optimization for cc-specific TDD configuration.

In an example embodiment, a method of providing uplink feedback optimization is provided. The method may include determining a set of candidate uplink subframes and corresponding component carriers to transmit uplink feedback, and determining a selected uplink subframe and corresponding component carrier from among the set of candidate uplink subframes based on a feedback delay associated with the set of candidate uplink subframes.

In another example embodiment, an apparatus for providing uplink feedback optimization is provided. The apparatus may include processing circuitry configured to perform at least determining a set of candidate uplink subframes and corresponding component carriers to transmit uplink feedback, and determining a selected uplink subframe and corresponding component carrier from among the set of candidate uplink subframes based on a feedback delay associated with the set of candidate uplink subframes.

In one example embodiment, a computer program product for providing uplink feedback optimization is provided. The computer program product may include at least one computer-readable storage medium having computer-executable program code instructions stored therein. The computer-executable program code instructions may include program code instructions for determining a set of candidate uplink subframes and corresponding component carriers to transmit uplink feedback, and determining a selected uplink subframe and corresponding component carrier from among the set of candidate uplink subframes based on a feedback delay associated with the set of candidate uplink subframes.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
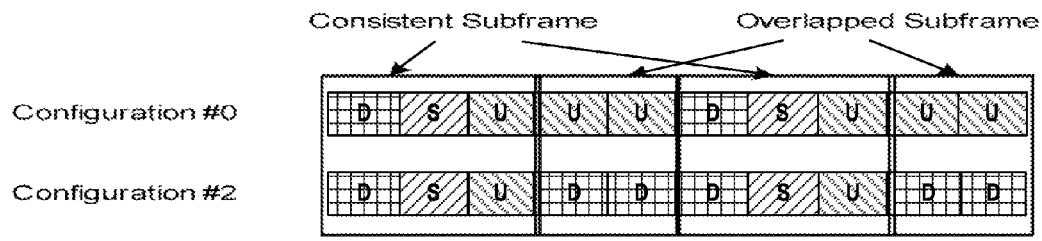
FIG. 1 illustrates an example of overlapped subframes in a CC specific TDD configuration according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As indicated above, different TDD configurations may be configured in different discontinuous component carriers (CCs) in CC-specific TDD configurations. One reason for allowing this may be that there is a perceived need for some CCs in realistic deployments to be compatible with neighbor legacy TDD systems (e.g., Time Division Synchronous Code Division Multiple Access (TD-SCDMA) systems and/ or the like), and then multiple CCs with aligned TDD configurations are not available. Another reason may be that different TDD DL/UL configurations on different CCs may be used to reach different coverages on different CCs. For example, more UL sub-frames in low frequencies may be enabled to better enlarge coverage. Thus, scenarios may be enabled in which CCs with different TDD configurations may be aggregated.

One specific feature for CC-specific TDD configuration carrier aggregation is that a different CC configuration on a different CC may result in overlapped subframes in some time instants. An overlapped subframe may be considered to exist where, for example, one CC is a DL subframe at a time instant n while another CC may be configured with an UL subframe. Thus, it is assumed that a LIE could perform simultaneous transmission and reception in overlapped subframes. FIG. 1 illustrates an example of overlapped subframes in a CC specific TDD configuration.

In Rel-10, UL feedback that is carried by a physical uplink control channel (PUCCH) is only transmitted on a primary cell (Pcell) to avoid a very high peak-to-average power ratio (PAPR) due to multiple PUCCH transmission on multiple CCs. However, with a CC specific TDD configuration, it may be possible for the PUCCH to also be moved to a secondary cell (Scell) if the Pcell is a DL subframe at a specific time instant, because this may also achieve the principles of current Rel-10 agreement.

With the assumption that PUCCH could also located on Scell, originally the UL subframes may only include UL feedback for their own CC. However, for those CCs configured with a DL subframe in this time instant, the UL subframes may also provide the potential opportunity of UL feedback transmission. Thus, for example, the UL subframes may be used to optimize the UL feedback delay of CCs configured with a DL subframe.

Figure 2:
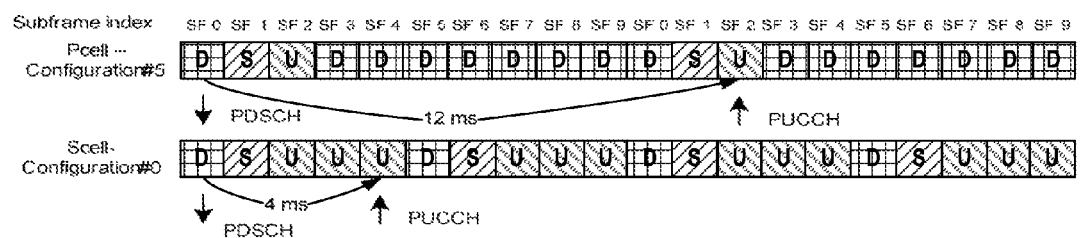
FIG. 2 illustrates an example of physical uplink control channel (PUCCH) timing of a CC-specific TDD configuration according to an example embodiment.

Assuming, as indicated above, that the PUCCH may be located on the Scell when the Pcell is a DL subframe at that time instant, the most straightforward way to define PUCCH timing (e.g., uplink feedback timing for CC-specific TDD configuration) may be that each configuration follows its own PUCCH timing. For example, Pcell may be configured with TDD configuration 5 and Scell may be configured with TDD configuration 0, such that PUCCH timing of Pcell will follow TDD configuration 5 and PUCCH timing of Scell will follow TDD configuration 0. FIG. 2 illustrates an example of PUCCH timing of a CC-specific TDD configuration as described above.

From the example of FIG. 2, it can be seen that the UL feedback on PUCCH for a physical downlink shared channel (PDSCH) in subframe 0 (SF#0) of the Pcell is 12 ms due to the limited UL subframe number of TDD configuration 5, while the UL feedback timing for the PDSCH in SF#0 of the Scell is 4 ms. Although this straightforward method of defining PUCCH timing may be workable for CC-specific TDD configurations, and may introduce little complexity, it may result in unbalanced packet transmission delay among different cells, which may impact reordering performance in the radio link control (RLC) layer, and may impact the packet loss rate and packet deliverable delay.

Accordingly, in order to reduce UL feedback delay and balance packet delay for UEs, some example embodiments may provide a mechanism to enable UL feedback optimization for CC-specific TDD configuration. In this regard, in some embodiment, a mechanism may be provided for determining a set of candidate uplink subframes and corresponding component carriers to transmit uplink feedback, and determining a selected uplink subframe and corresponding component carrier from among the set of candidate uplink subframes based on a feedback delay associated with the set of candidate uplink subframes.

Figure 3:
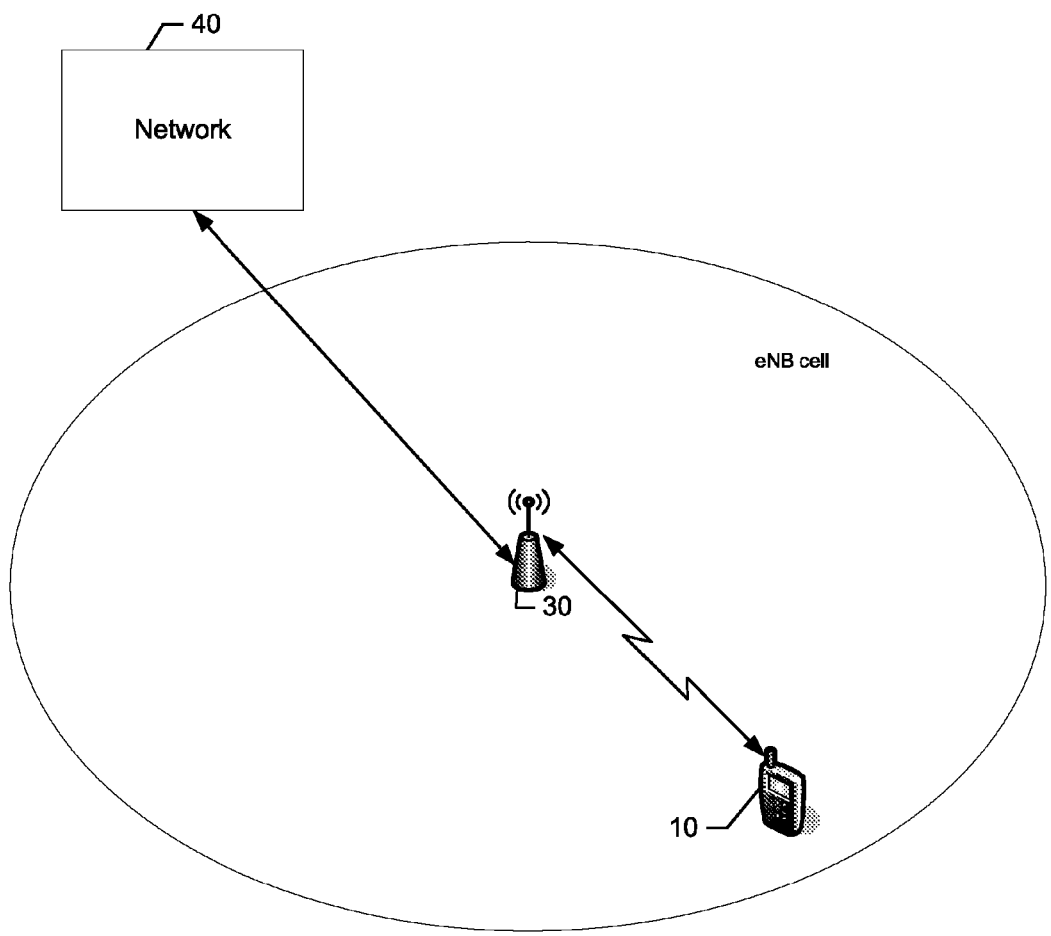
FIG. 3 illustrates one example of a communication system according to an example embodiment of the present invention.

FIG. 3 illustrates a generic system diagram in which devices that may benefit from embodiments of the present invention are shown in an example communication environment. It should be noted that although FIG. 3 shows one example communication environment, other communication environments in connection with which embodiments of the present invention may be practiced are also possible. As such, in some cases more instances of some of the components described herein, or components with similar functions in networks other than the example network described herein could alternatively be employed in connection with embodiments of the present invention.

As shown in FIG. 3, an embodiment of a system in accordance with an example embodiment of the present invention may include a UE 10 and an eNB 30. The eNB 30 may be an example of a base station or access point for communication with a network 40 (for example LTE-A). As such, the eNB 30 may employ hardware including, for example, an antenna to provide for transmitting and/or receiving communication signals and processing circuitry to enable control of the eNB 30 in accordance with applicable communication standards.

The network 40 may include a collection of various different nodes, devices or functions that may be in communication with each other via corresponding wired and/or wireless interfaces. As such, the illustration of FIG. 3 should be understood to be an example of a broad view of certain elements of the system and not an all inclusive or detailed view of the system or the network 40. One or more communication terminals such as the UE 10 may be in communication with the network 40 and/or each other via the network 40 and each may include an antenna or antennas for transmitting signals to and for receiving signals from a base site (e.g., eNB 30), which could be, for example a base station that is a part of one or more cellular or mobile networks (e.g., wideband code division multiple access (W-CDMA), CDMA2000, global system for mobile communications (GSM), general packet radio service (CPRS), LTE, LTE A and/or the like) or an access point that may be coupled to a data network, such as a local area network (LAN), a metropolitan area network (MAN), and/or a wide area network (WAN), such as the Internet, which may employ any of a number of different wireline or wireless communication techniques, including wireless LAN (WLAN), Worldwide Interoperability for Microwave Access (WiMAX), WiFi, ultra-wide band (LTWB), Wibree techniques and/or the like. In turn, other devices such as processing elements (e.g., personal computers, server computers or the like) may be coupled to the UE 10 via the network 40. By directly or indirectly connecting the UE 10 and other devices to the network 40 or to each other, the UE 10 may be enabled to communicate with the network 40 and/or other devices, for example, according to numerous communication protocols including Hypertext Transfer Protocol (HTTP) and/or the like, to thereby carry out various communication or other functions of the UE 10.

In example embodiments, the UE 10 may be a mobile communication device such as, for example, a personal digital assistant (PDA), wireless telephone, mobile computing device, smart phone, or various other like devices. As such, the UE 10 may include, for example, processing circuitry that may include at least one processor and at least one memory for storing instructions that are executable by the processor in order to cause the LIE 10 to perform corresponding operations that are defined by the instructions. In some cases, the processor of the UE 10 may be embodied as, include, or otherwise control processing hardware such as one or more application specific integrated circuits (ASICs) that are configured to provide a corresponding specific functionality.

As shown in FIG. 3, the eNB 30 may have a corresponding coverage area defining a cell served by the eNB 30. In general, the eNB 30 may communicate with UEs within its cell directly via wireless links when conditions permit. A plurality of other eNBs may also be present to define other cells.

Figure 4:
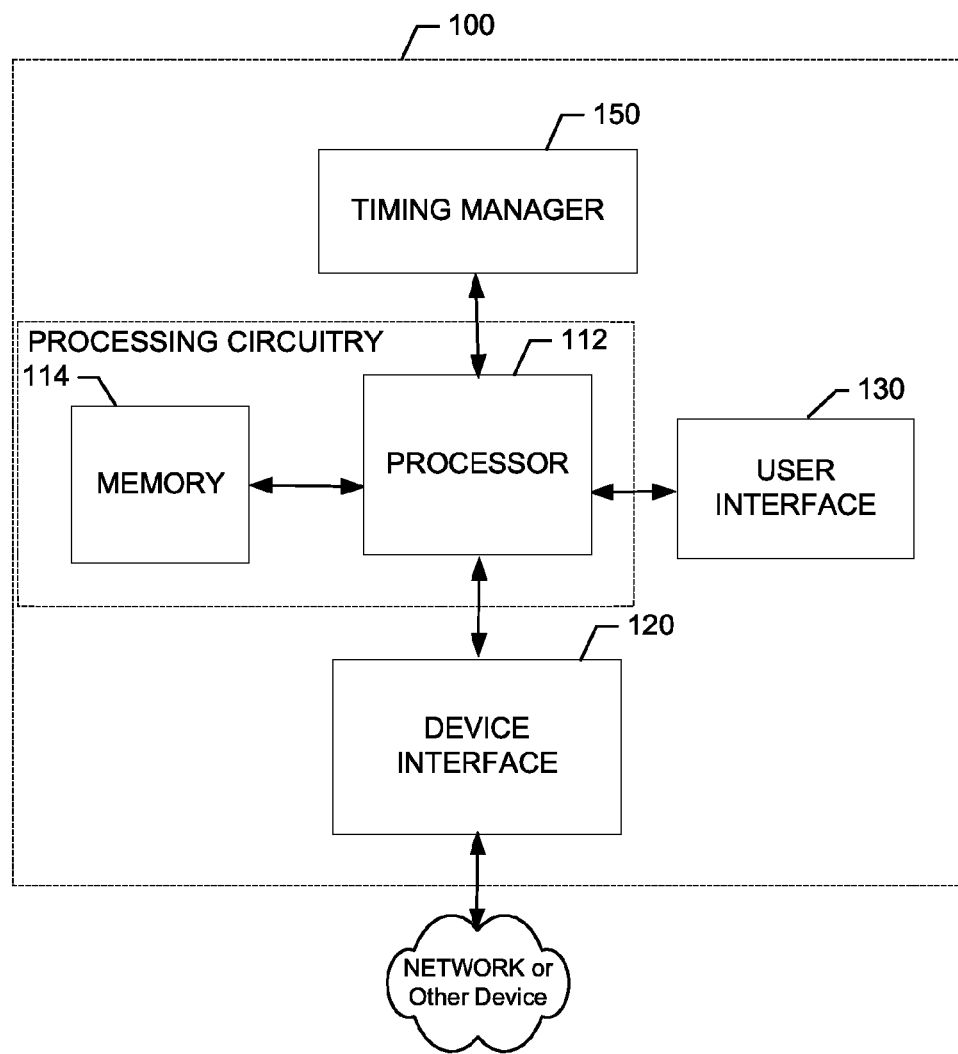
FIG. 4 illustrates a block diagram showing an apparatus for providing uplink feedback optimization in accordance with an example embodiment of the present invention.

FIG. 4 illustrates an example apparatus 100 that may be configured to perform UL feedback optimization in accordance with an example embodiment. An example embodiment of the invention will now be described with reference to FIG. 4, in which certain elements of an apparatus 100 for providing UL feedback optimization are displayed. The apparatus 100 of FIG. 4 may be employed, for example, on the UE 10 of FIG. 3. However, it should be noted that the components, devices or elements described below may not be mandatory and thus some may be omitted in certain embodiments. Additionally, some embodiments may include further or different components, devices or elements beyond those shown and described herein.

Referring now to FIG. 4, the apparatus 100 may include or otherwise be in communication with processing circuitry 110 that is configurable to perform actions in accordance with example embodiments described herein. The processing circuitry 110 may be configured to perform data processing, application execution and/or other processing and management services according to an example embodiment of the present invention. In some embodiments, the apparatus 100 or the processing circuitry 110 may be embodied as a chip or chip set. In other words, the apparatus 100 or the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 100 or the processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of a server, computer, workstation or other fixed or mobile computing device. In situations where the processing circuitry 110 is embodied as a server or at a remotely located computing device, the user interface 130 may be disposed at another device (e.g., at a computer terminal or client device) that may be in communication with the processing circuitry 110 via the device interface 120 and/or a network.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a keyboard, a mouse, a joystick, a display, a touch screen, a microphone, a speaker, and/or other input/output mechanisms. In an exemplary embodiment in which the apparatus is embodied at a server or other network device, the user interface 130 may be fully implemented, limited, remotely located or eliminated.

The device interface 120 may include one or more interface mechanisms for enabling communication with other devices and/or networks. In some cases, the device interface 120 may be any means such as a device or circuitry embodied in either hardware, or a combination of hardware and software that is configured to receive and/or transmit data from/to a network and/or any other device or module in communication with the processing circuitry 110. In this regard, the device interface 120 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the apparatus 100 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one of a plurality of databases that may store a variety of files, contents or data sets. Among the contents of the memory 114, applications may be stored for execution by the processor 112 in order to carry out the functionality associated with each respective application. In some cases, the memory 114 may be in communication with the processor 112 via a bus for passing information among components of the apparatus 100.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control a timing manager 150. As such, in some embodiments, the processor 112 (or the processing circuitry 110) may be said to cause each of the operations described in connection with the timing manager 150 by directing the timing manager 150 to undertake the corresponding functionalities responsive to execution of instructions or algorithms configuring the processor 112 (or processing circuitry 110) accordingly. The timing manager 150 may be configured to determine UL feedback timing as described herein.

It may be assumed that a UE (e.g., UE 10) operating in accordance with an example embodiment is allowed to transmit PUCCH on only one UL CC at a time. It may also be assumed that the LTE is configured with multiple DL and UL CCs. The set C1 may denote all configured CCs for a UE and C2 may denote the subset of the configured CCs in which it is DL in subframe #n for the same UE. The term feedback delay may be defined as the distance between the DL subframe in which PDSCH is transmitted and the UL subframe in which the UL ACK/NACK is transmitted. The DL CC operating on the same carrier frequency as a UL CC #j may be denoted as the DL linked to the UL CC.

The timing manager 150 may be configured to determine UL feedback timing. For example, the timing manager 150 may be configured to determine in which UL subframe and on which UL CC the UE is to transmit the ACK/NACK feedback for the DL CCs. Although an example will be described in relation to a given DL subframe #n, it should be appreciated that the procedure applies to all DL subframes that may include PDSCH transmissions. Thus, in practice, the timing manager 150 may be configured to run the procedure for all DL subframes so that the UL feedback timing is clear and may be aligned at both the UE and the eNB. The timing manager 150 may also be configured to form an ACK/NACK bit sequence. In this regard, for example, it may be possible that in a given UL subframe in a selected UL CC, ACK/NACK bits may need transmission for multiple DL CCs and/or DL subframes. The timing manager 150 may be configured to operate as described above in relation to cases where UL ACK/NACK transmission on a selected UL CC is piggybacked on physical uplink shared channel (PUSCH). In some embodiments, the timing manager 150 may also be configured to handle resource allocation for PUCCH in different potential PUCCH formats.

UL feedback timing for PDSCH transmissions in subframe #n may be determined based on the following operations according to a DL HARQ timing scheme in which operation attributed to the UE may be performed by the timing manager 150, as appropriate. A first operation in the determination of UL feedback timing may include determining which UL subframe of which corresponding CC to transmit the UL feedback. Thus, for each CC within the set C2, the UE (e.g., via the timing manager 150) may determine the nearest UL subframe that is after subframe #n+3 (e.g., based on the TDD UL/DL configuration on that cell). The set of determined UL subframes in the set C2 may be denoted as set S1. Thus, for each subframe within set S1 there may be a corresponding UL CC within set C1.

Figure 5:
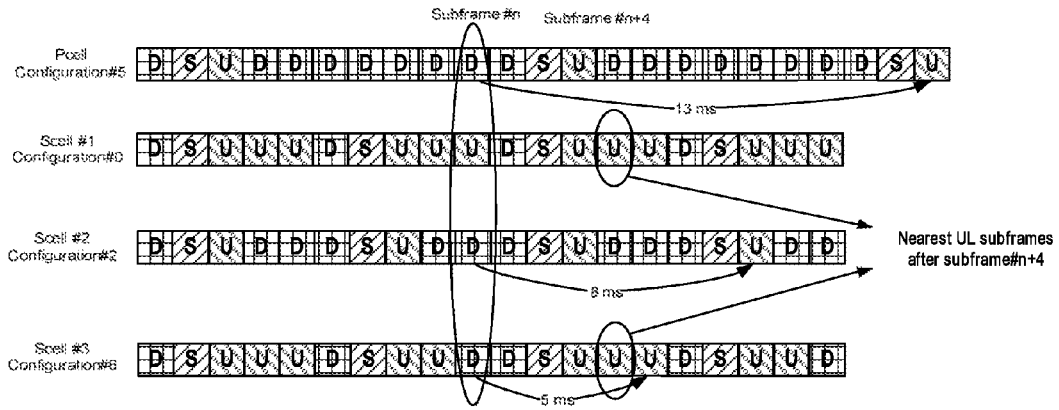
FIG. 5 illustrates timing associated with uplink feedback timing determination in accordance with an example embodiment of the present invention.

As an example, four CCs may be configured for the UE, and Pcell may be configured with TDD configuration 5. Meanwhile, Scell#1 may be configured with TDD configuration 0, Scell#2 may be configured with TDD configuration 2 and Scell#3 may be configured with TDD configuration 6 as shown in FIG. 5. For the first operation, the UE may find the nearest UL subframe after subframe #n+3. In this example, all CCs configured for the UE belong to set C1. At subframe #n, Pcell, Scell#2 and Scell#3 each belong to set C2. The UL subframe in Scell#1 and Scell#3 at subframe #n+4 belong to set S1, and the corresponding CC set C3 includes Scell#1 and Scell#3.

As a second operation in the determination of UL feedback timing, a check may be made as to whether the set C3 includes a Pcell and also determine whether an Scell carries the UL feedback. For example, the second operation may include, for the set of UL subframes S1 and the set CC C2, the UE determining the UL subframe and corresponding UL CC which provides a minimum UL feedback delay. If there are multiple CCs (denoted as C3) within set C1 that provide equally minimum feedback delay, the UE may be configured to check if there is an UL Pcell among those multiple CCs within set C3. If yes, UL Pcell and the corresponding UL subframe in set S1 may be selected. If there is no Pcell in set C3, one Scell and the corresponding UL subframe in set S1 may be selected based on a selection rule. For the set S1 and C3 constructed by the UE in the first operation considering this example, since no Pcell is included, the UL feedback will not be transmitted on the Pcell. If the Pcell was included in set C3, all UL feedback would be transmitted via the Pcell and the procedure for the HARQ timing scheme would be finished. However, since Pcell is not included in set C3 in this example, the selection rule must be applied.

The selection rule may apply to cases where the UE finds multiple UL Scells that provide equally minimum feedback delay. In some cases, the selection rule may provide that the UE transmits UL feedback in the UL CC with the smallest (or greatest) CC index among the other CCs. Alternatively, the selection rule may provide that the UE is to follow some higher-layer configured priority order in determining the CC to transmit UL feedback. As yet another alternative, the selection rule may provide that some dynamic DL control signaling is introduced to inform the UE as to which CC to utilize to transmit the UL feedback. As still another alternative, the selection rule may define that the UE selects the UL CC in which there are PUSCH transmissions.

According to this example, since there are multiple Scells in set C3 that fulfill the requirement for UL subframe selection, one Scell may be selected according to the selection rule. If it is assumed, according to the example of FIG. 5, that Scell#3 is selected to transmit UL feedback, then all UL feedbacks may temporarily be determined to transmit in Scell#3 at subframe #n+4. According to the second operation, the selected UL subframe #k may be the UL subframe on Scell#3 at subframe #n+4.

A third operation associated with the DL HARQ timing scheme may include checking the feedback delay on the selected Scell. The third operation may include an assumption that, in the second operation, the UL subframe #k on the UL CC #j is selected. Then, the third operation may include the UE checking as to whether the DL subframe #n is within the DL association set of the UL subframe #k on CC #j. If not, ACK/NACK may not be transmitted for the DL cell that is linked to the UL CC #j. According to the third operation, for the selected Scell and UL subframe that are to transmit UL feedback delays, the UE may check as to whether DL subframe #n is within the DL association set of the UL subframe #k on CC #j, for example, if the UL feedback delay stored in the first operation is the same with the new defined UL feedback delay.

Figure 6:
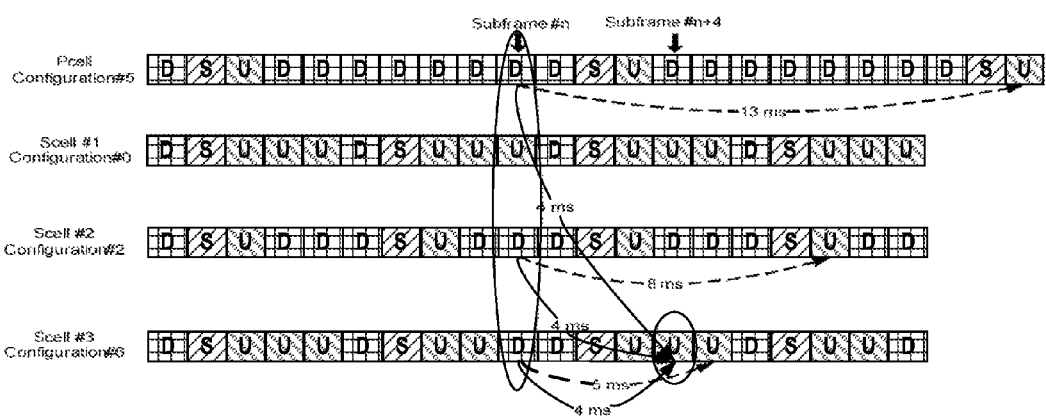
FIG. 6 illustrates another example of timing associated with uplink feedback timing determination in accordance with an example embodiment of the present invention.
Figure 7:
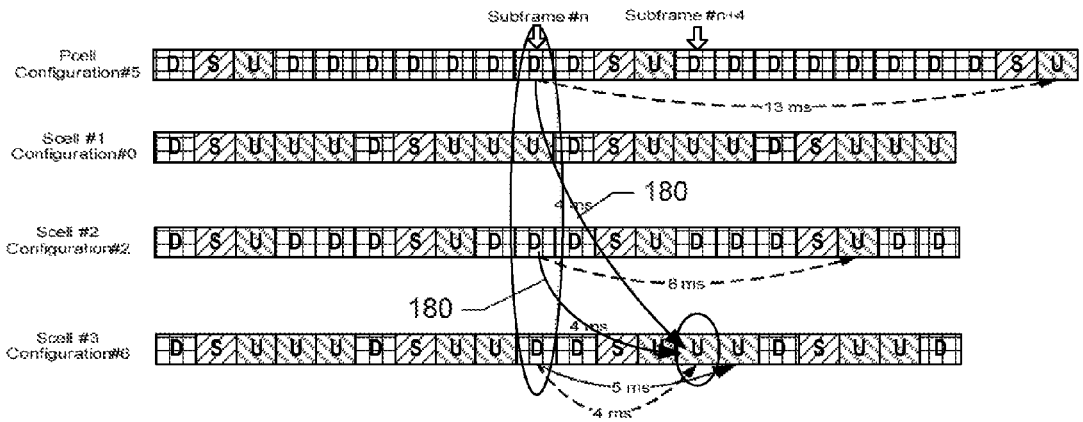
FIG. 7 illustrates yet another example of timing associated with uplink feedback timing determination in accordance with an example embodiment of the present invention.

For the example described above, for Scell#3, which is selected to transmit the UL feedback delay as shown in FIG. 6, the new defined UL feedback delay which is 4 ms is not the same as the original stored UL feedback delay for Scell#3 (which was 5 ms). Thus, the UL feedback of DL subframe #n for Scell may not be included in subframe #n+4. The UL feedback of subframe #n for Scell #3 may still be according to the stored feedback delay of the first operation as shown in FIG. 7. Thus, final results for the example shown in FIGS. 5-7 are that for DL subframe #n, both Pcell and Scell#2 have UL feedback delays of 4 ms, and Scell#3 has the UL feedback of 5 ms, which is shown by the lines marked 180 in FIG. 7.

As indicated above, the timing manager 150 may also be configured to handle formation of the ACK/NACK bit sequence. In this regard, the timing manager 150 may be configured to arrange ACK/NACK bits before channel encoding. As such, in some embodiments, the UE may follow a procedure to determine, in UL subframe #n, the number of ACK/NACK bits N_i that are to be provided as feedback for each configured CC #i, where i=1, ..., N, and N is the number of configured CCs. The UE may be configured to arrange the ACK/NACK bits based on the following operations so that the eNB and the UE may have the same understanding of each of the ACK/NACK bits. In this regard, if it is assumed that cell #j is used for transmitting PUCCH according to the procedure described above, the ACK/NACK bits of cell #j may be mapped in a beginning sequence, and all the other cells of the ACK/NACK bits may be sequentially mapped to the sequence based on, for example, the cell index. If, for a given CC, there are ACK/NACK bits corresponding to multiple DL subframes, the ACK/NACK bits corresponding to the given CC may be arranged according to the subframe index. This arrangement may avoid any ambiguity if the eNB is to reconfigure the ACK/NACK feedback modes without the optimization proposed above. Such reconfiguration may be provided, for example, when the eNB decides that some of the UL CCs provide poor UL coverage and are therefore not sufficient to carry the UL feedback for other UL CCs (or even for the same UL CC). Thus, the eNB may desire to reconfigure the set of CCs that are allowed to transmit UL feedback. Note that the proposed ACK/NACK bits arrangement may solve the reconfiguration ambiguity of the proposed feedback delay reduction scheme, but may not solve the CC-reconfiguration ambiguity which is general for all carrier aggregation schemes.

In some cases, there may be situations when there are no ACK/NACK bits to transmit for UL CC #j itself (e.g., due to PDCCH missing or a lack of a scheduled PDSCH). However, other CCs may need to transmit the UL feedback there for reduced feedback delay. In such cases, the ACK/NACK bits may still be reserved for UL CC #j (but may be mapped to zero for NACK), which may not be considered as overhead since the eNB may have the scheduling information and can take it into account in decoding.

Figure 8:
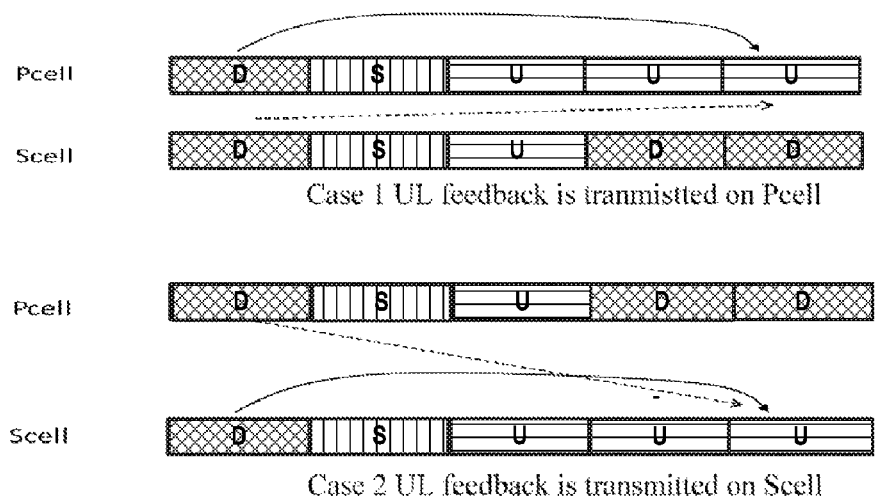
FIG. 8 illustrates an example of uplink feedback transmitted on a secondary cell in two cases as an example of PUCCH resource allocation in accordance with an example embodiment of the present invention.

In some embodiments, the timing manager 150 may be further configured to engage in PUCCH resource determination. FIG. 8 illustrates an example of UL feedback transmitted on an Scell in two cases as an example of PUCCH resource allocation. In some examples, two PUCCH modes may be practiced in connection with example embodiments, namely PUCCH format 1b with channel selection and PUCCH format 3. In LTE Rel-10 TDD channel selection, it may only be possible to employ up to two configured CCs. However, for PUCCH format 3, no such limit may apply. For PUCCH format 1b with channel selection, case 1 in FIG. 8 illustrates that there may be one or two PUCCH resources implicitly assigned from Pcell PDCCH. In this case, if the Scell is cross scheduled from the Pcell in the first DL subframe, there may still be implicit resources from those PDCCHs. If, for case 1, the Scell is not cross-scheduled from the Pcell, some PUCCH resources may need to be assigned by the Scell explicitly, for example, based on ART. For case 2, if Scell is cross-scheduled from the Pcell, all PUCCH resources may be implicitly assigned. However, in some cases, there may be some other UEs configured with only one cell (e.g., the same cell as the Scell of the considered UE), which may assume PUCCH assigned on the same cell implicitly only from the PDCCH on the same cell. To avoid such a collision, explicit resources may be assigned via the PDCCHs from the Pcell.

For PUCCH format 1b, the PUCCH resources may be allocated in the UL CC, which may be determined for ACK/NACK transmissions. If the PUCCH is on the Pcell, then implicit PUCCH resources may be assigned by the PDCCH from the Pcell, and explicit PUCCH resources may be assigned by PDCCH from the Scell. If the PUCCH is on the Scell, then implicit PUCCH resources may be assigned by PDCCH from the Scell (if any), and explicit PUCCH resources may be assigned by PDCCH from the Pcell.

For PUCCH format 3, explicit resources may be assigned for each UL CC. When there is a PDCCH corresponding to the PDSCH on the UL CC, the ARI bits in PDCCH may be used to indicate one PUCCH format 3 resource among a set of resources configured by a higher layer. When there is no PDCCH corresponding to the PDSCH on the UL CC (e.g., for SPS transmission or for the case where the selected UL CC has no PDSCH or ACK/NACK feedback), some predefined PUCCH resource may be used and the configuration of such resources shall be from a higher layer.

Some example embodiments may therefore propose mechanisms by which to decrease UL feedback delay in CC specific TDD configuration carrier aggregation. Corresponding DL HARQ process delay may then be decreased due to an asynchronous HARQ scheme. Meanwhile, PUCCH resource determination and bit arrangement schemes may be utilized to effectively solve PUCCH resource mapping issues.

Figure 9:
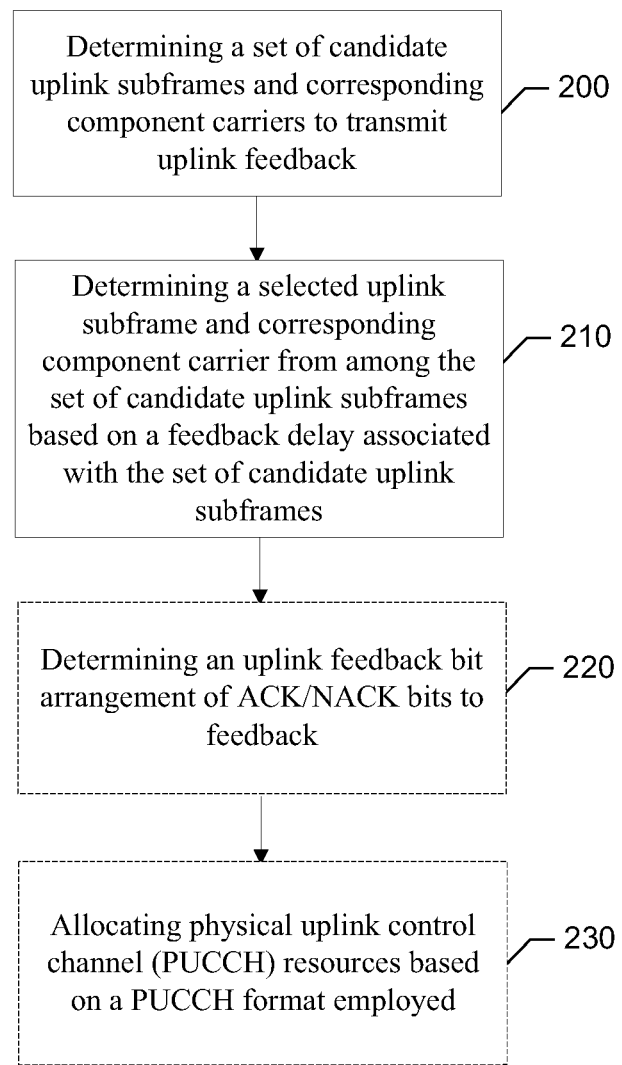
FIG. 9 illustrates a flowchart of a method of providing uplink feedback optimization in accordance with an example embodiment of the present invention.

FIG. 9 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware)

to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 9, when executed, convert a computer or processing circuitry into a particular machine configured to perform an example embodiment of the present invention. Accordingly, the operations of FIG. 9 define an algorithm for configuring a computer or processing circuitry (e.g., processor 112) to perform an example embodiment. In some cases, a general purpose computer may be provided with an instance of the timing manager 150, which performs the algorithm shown in FIG. 9 (e.g., via configuration of the processor 112), to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for providing uplink feedback optimization, as shown in FIG. 9, includes determining a set of candidate uplink subframes and corresponding component carriers to transmit uplink feedback at operation 200, and determining a selected uplink subframe and corresponding component carrier from among the set of candidate uplink subframes based on a feedback delay associated with the set of candidate uplink subframes at operation 210.

In some embodiments, certain ones of the operations above may be modified or further amplified as described below. Moreover, in some embodiments additional optional operations may also be included (some examples of which is shown in dashed lines in FIG. 9). It should be appreciated that each of the modifications, optional additions or amplifications below may be included with the operations above either alone or in combination with any others among the features described herein. In an example embodiment, the method may further include determining an uplink feedback bit arrangement of ACK/NACK bits to feedback at operation 220. In some cases, the method may further include determining whether a downlink subframe is included in a downlink association set of a selected uplink subframe on a selected component carrier to determine whether uplink feedback is included. In an example embodiment, determining the uplink feedback bit arrangement may include providing ACK/NACK bits corresponding to an uplink component carrier on which a physical uplink control channel (PUCCH) is transmitted in a beginning of a bit sequence, mapping other bits of the bit sequence based on a predefined order, and arranging ACK/NACK bits corresponding to a CC having ACK/NACK bits corresponding to multiple downlink subframes according to a subframe index.

In some example embodiments, the method may further include allocating physical uplink control channel (PUCCH) resources based on a PUCCH format employed (e.g., PUCCH format 1b with channel selection or PUCCH format 3) and a component carrier on which downlink grants are transmitted at operation 230 in order to avoid the resource ambiguity from implicit allocation when the DL grants corresponding to the data on Scell would be transmitted from some of the Scells. In an example embodiment, determining the set of candidate uplink subframes may include determining a nearest uplink subframe in which and uplink ACK/NACK is transmitted after a downlink subframe in which a physical downlink shared channel (PDSCH) is transmitted. In some cases, determining the nearest uplink subframe may include determining a nearest uplink subframe after subframe #n+3 where subframe #n is the subframe in which the PDSCH is transmitted. In some embodiments, determining the selected uplink subframe may include determining the selected uplink subframe responsive to a determination as to whether multiple component carriers provide equal feedback delay. In such an embodiment, in response to multiple component carriers providing equal feedback delay, the method may further include determining whether an uplink primary cell is among the multiple component carriers, selecting the uplink primary cell for providing uplink feedback in response to the uplink primary cell being among the multiple component carriers, and employing a selection rule to select a secondary cell and corresponding uplink subframe in response to the uplink primary cell not being among the multiple component carriers. The selection rule may include selecting one of the multiple component carriers for providing uplink feedback based on a component carrier index of each component carrier, a higher-layer configured priority order, dynamic downlink control signaling, or the selected one of the multiple component carriers including physical uplink shared channel (PUSCH) transmissions.

In an example embodiment, an apparatus for performing the method of FIG. 9 above may comprise a processing circuitry (e.g., processing circuitry 110) configured to perform some or each of the operations (200-230) described above, with or without some or all of the modifications described above. The processing circuitry 110 may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the timing manager 150. Additionally or alternatively, at least by virtue of the fact that the processing circuitry 110 may be configured to control or even be embodied as the timing manager 150, the processing circuitry 110 and/or a device or circuitry for executing instructions or executing an algorithm for processing information as described above may also form example means for performing operations 200-230.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
identifying a set of candidate uplink subframes and corresponding component carriers in a carrier aggregation configuration on which to transmit uplink feedback;
determining a feedback delay associated with each of the candidate uplink subframes in the set of candidate uplink subframes;
selecting an uplink subframe and corresponding component carrier from among the set of candidate uplink subframes based on the determined feedback delay associated with each of the candidate uplink subframes, wherein selecting the uplink subframe comprises determining a nearest uplink subframe of the set of candidate uplink subframes in which an uplink ACK/NACK is transmitted after a downlink subframe in which a physical downlink shared channel (PDSCH) is transmitted; and
transmitting the uplink feedback via the selected uplink subframe and corresponding component carrier.

2. The method of claim 1, wherein selecting the uplink subframe comprises determining a nearest uplink subframe after subframe #n+3 where subframe #n is the subframe in which the PDSCH is transmitted.

3. The method of claim 1, wherein selecting the uplink subframe comprises determining the selected uplink subframe responsive to a determination as to whether multiple component carriers provide equal feedback delay, and wherein, in response to multiple component carriers providing equal feedback delay, the method further comprises:
determining whether an uplink primary cell is among the multiple component carriers;
selecting the uplink primary cell for providing uplink feedback in response to the uplink primary cell being among the multiple component carriers; and
employing a selection rule to select a secondary cell and corresponding uplink subframe in response to the uplink primary cell not being among the multiple component carriers.

4. The method of claim 3, wherein the selection rule comprises selecting one of the multiple component carriers for providing uplink feedback based on at least one of:
a component carrier index of each component carrier;
a higher-layer configured priority order;
dynamic downlink control signaling; or
the selected one of the multiple component carriers including physical uplink shared channel (PUSCH) transmissions.

5. The method of claim 1, further comprising determining an uplink feedback bit arrangement of ACK/NACK bits to feedback.

6. The method claim 5, wherein determining the uplink feedback bit arrangement comprises:
providing ACK/NACK bits corresponding to an uplink component carrier on which a physical uplink control channel (PUCCH) is transmitted in a beginning of a bit sequence;
mapping other bits of the bit sequence based on a predefined order; and
arranging ACK/NACK bits corresponding to a component carrier having ACK/NACK bits corresponding to multiple downlink subframes according to a subframe index.

7. The method of claim 1, further comprising allocating physical uplink control channel (PUCCH) resources based on a PUCCH format employed and a component carrier on which downlink grants are transmitted.

8. The method of claim 1, further comprising determining whether a downlink subframe is included in a downlink association set of a selected uplink subframe on a selected component carrier to determine whether uplink feedback is included.

9. An apparatus comprising processing circuitry configured to perform at least:
identifying a set of candidate uplink subframes and corresponding component carriers in a carrier aggregation configuration on which to transmit uplink feedback;
determining a feedback delay associated with each of the candidate uplink subframes in the set of candidate uplink subframes;
selecting an uplink subframe and corresponding component carrier from among the set of candidate uplink subframes based on the determined feedback delay associated with each of the candidate uplink subframes, wherein selecting the uplink subframe comprises determining a nearest uplink subframe of the set of candidate uplink subframes in which an uplink ACK/NACK is transmitted after a downlink subframe in which a physical downlink shared channel (PDSCH) is transmitted; and
transmitting the uplink feedback via the selected uplink subframe and corresponding component carrier.

10. The apparatus of claim 9, wherein the processing circuitry is configured to select the uplink subframe by determining a nearest uplink subframe after subframe #n+3 where subframe #n is the subframe in which the PDSCH is transmitted.

11. The apparatus of claim 9, wherein the processing circuitry is configured select the uplink subframe responsive to a determination as to whether multiple component carriers provide equal feedback delay, and wherein, in response to multiple component carriers providing equal feedback delay, the processing circuitry is further configured to perform:
determining whether an uplink primary cell is among the multiple component carriers;
selecting the uplink primary cell for providing uplink feedback in response to the uplink primary cell being among the multiple component carriers; and
employing a selection rule to select a secondary cell and corresponding uplink subframe in response to the uplink primary cell not being among the multiple component carriers.

12. The apparatus of claim 11, wherein the selection rule comprises selecting one of the multiple component carriers for providing uplink feedback based on at least one of:
a component carrier index of each component carrier;
a higher-layer configured priority order;
dynamic downlink control signaling; or the selected one of the multiple component carriers including physical uplink shared channel (PUSCH) transmissions.

13. The apparatus of claim 9, wherein the processing circuitry is further configured to determine an uplink feedback bit arrangement of ACK/NACK bits to feedback.

14. The apparatus of claim 13, wherein the processing circuitry being configured to determine the uplink feedback bit arrangement comprises the processing circuitry being configured to:
provide ACK/NACK bits corresponding to an uplink component carrier on which a physical uplink control channel (PUCCH) is transmitted in a beginning of a bit sequence;
map other bits of the bit sequence based on a predefined order; and
arrange ACK/NACK bits corresponding to a component carrier having ACK/NACK bits corresponding to multiple downlink subframes according to a subframe index.

15. The apparatus of claim 9, wherein the processing circuitry is further configured to allocate physical uplink control channel (PUCCH) resources based on PUCCH format employed and a component carrier on which downlink grants are transmitted.

16. The apparatus of claim 9, wherein the processing circuitry is further configured to determine whether a downlink subframe is included in a downlink association set of a selected uplink subframe on a selected component carrier to determine whether uplink feedback is included.

17. At least one non-transitory computer-readable storage medium having computer-executable program code instructions stored therein, the computer-executable program code instructions comprising program code instructions for:
identifying a set of candidate uplink subframes and corresponding component carriers in a carrier aggregation configuration on which to transmit uplink feedback;
determining a feedback delay associated with each of the candidate uplink subframes in the set of candidate uplink subframes;
selecting an uplink subframe and corresponding component carrier from among the set of candidate uplink subframes based on the determined feedback delay associated with each of the candidate uplink subframes, wherein selecting the uplink subframe comprises determining a nearest uplink subframe of the set of candidate uplink subframes in which an uplink ACK/NACK is transmitted after a downlink subframe in which a physical downlink shared channel (PDSCH) is transmitted; and
transmitting the uplink feedback via the selected uplink subframe and corresponding component carrier.

18. The at least one non-transitory computer-readable storing medium of claim 17, wherein program code instructions for determining the set of candidate uplink subframes include instructions for determining a nearest uplink subframe in which an uplink ACK/NACK is transmitted after a downlink subframe in which a physical downlink shared channel (PDSCH) is transmitted.

* * * * *